US012282344B2

(12) United States Patent
Jiang et al.

(10) Patent No.: US 12,282,344 B2
(45) Date of Patent: Apr. 22, 2025

(54) GAS PRESSURE REGULATING DEVICE FOR VEHICLE

(71) Applicant: YAPP AUTOMOTIVE PARTS (KAIFENG) CO., LTD., Henan (CN)

(72) Inventors: Lin Jiang, Henan (CN); Shaowen Hu, Henan (CN); Yinchun Liu, Henan (CN); Guanghui Tan, Henan (CN); Kaifeng Guo, Henan (CN); Hao Guo, Henan (CN)

(73) Assignee: YAPP AUTOMOTIVE PARTS (KAIFENG) CO., LTD., Henan (CN)

( * ) Notice: Subject to any disclaimer, the term of this patent is extended or adjusted under 35 U.S.C. 154(b) by 450 days.

(21) Appl. No.: 17/781,725

(22) PCT Filed: Dec. 28, 2021

(86) PCT No.: PCT/CN2021/142117
§ 371 (c)(1),
(2) Date: Jun. 2, 2022

(87) PCT Pub. No.: WO2023/284256
PCT Pub. Date: Jan. 19, 2023

(65) Prior Publication Data
US 2023/0205238 A1 Jun. 29, 2023

(30) Foreign Application Priority Data
Jul. 13, 2021 (CN) ......................... 202110791174.4

(51) Int. Cl.
*G05D 16/10* (2006.01)
*B01D 46/24* (2006.01)
(Continued)

(52) U.S. Cl.
CPC ........... *G05D 16/109* (2019.01); *B01D 46/24* (2013.01); *G05D 16/103* (2013.01);
(Continued)

(58) Field of Classification Search
CPC ... B01D 46/24; F16K 1/32; F16K 1/44; F16K 17/30; F16K 27/02; G05D 16/0402; G05D 16/103; G05D 16/109
See application file for complete search history.

(56) References Cited

U.S. PATENT DOCUMENTS

2017/0153653 A1 6/2017 Hata et al.

FOREIGN PATENT DOCUMENTS

CH 405851 1/1966
CN 211423455 9/2020
(Continued)

OTHER PUBLICATIONS

"International Search Report (Form PCT/ISA/210) of PCT/CN2021/142117," mailed on Apr. 2, 2022, pp. 1-5.
(Continued)

*Primary Examiner* — Brian A McCaig
(74) *Attorney, Agent, or Firm* — JCIPRNET

(57) ABSTRACT

The disclosure relates to a gas pressure regulating device for vehicle. A gas pressure regulating device for vehicle includes a valve seat and a valve cavity housing. The valve seat is provided with a valve core insertion hole, and a bottom of the valve core insertion hole is provided with a valve port. The valve cavity housing is detachably assembled with the valve seat. A valve core is guided and assembled in the valve cavity housing, the valve core has an inserted segment, the inserted segment is inserted in the valve core insertion hole, and the valve core is provided with a flow channel. An insertion sealing ring is provided between a hole wall of the valve core insertion hole and an outer peripheral surface of the inserted segment of the valve core. The valve seat and the valve cavity housing are relatively translated in an axial direction of the valve core insertion hole and are assembled in place in a relatively
(Continued)

translational manner. A fixed structure is provided between the valve seat and the valve cavity housing, and the fixed structure is configured to relatively fix the valve seat and the valve cavity housing when the valve seat and the valve cavity housing are assembled in place.

12 Claims, 6 Drawing Sheets

(51) Int. Cl.

| | |
|---|---|
| *H01M 8/04082* | (2016.01) |
| *H01M 8/04089* | (2016.01) |
| *H01M 8/0438* | (2016.01) |

(52) U.S. Cl.

CPC .... *H01M 8/04089* (2013.01); *H01M 8/04201* (2013.01); *H01M 8/04388* (2013.01); *H01M 2250/20* (2013.01)

(56) References Cited

FOREIGN PATENT DOCUMENTS

| | | |
|---|---|---|
| JP | 2016094962 | 5/2016 |
| KR | 20170076782 | 7/2017 |

OTHER PUBLICATIONS

"Written Opinion of the International Searching Authority (Form PCT/ISA/237) of PCT/CN2021/142117," mailed on Apr. 2, 2022 pp. 1-3.

"Search Report of Europe Counterpart Application", issued on Aug. 26, 2024, p. 1-p. 7.

GAS PRESSURE REGULATING DEVICE FOR VEHICLE

CROSS-REFERENCE TO RELATED APPLICATION

This application is a 371 of international application of PCT application serial no. PCT/CN2021/142117, filed on Dec. 28, 2021, which claims the priority benefit of China application no. 202110791174.4, filed on Jul. 13, 2021. The entirety of each of the above mentioned patent applications is hereby incorporated by reference herein and made a part of this specification.

TECHNICAL FIELD

The disclosure relates to a gas pressure regulating device for vehicle.

DESCRIPTION OF RELATED ART

Fluid pressure regulating devices are applied in a number of fields. For instance, in the control technology of the on-board hydrogen energy system of the hydrogen fuel cell vehicles, the high-pressure hydrogen fluid pressure regulating device is the key component. At present, with the rapid development of the new-energy vehicle market, vehicles powered by hydrogen fuel cells have gradually become an important direction for exploring the solution to the crises of energy resources as well as the environmental crisis. However, for vehicles powered by hydrogen fuel cells, the pressure of the hydrogen storage system determines the amount of stored hydrogen. At present, the hydrogen storage pressure of a high hydrogen storage system may reach 70 Mpa, while the hydrogen input pressure required by the pile is only 1 Mpa to 2 Mpa. Therefore, a fluid pressure regulating device is required to be provided between the gas outlet system and the pile for pressure regulating, and the fluid pressure regulating device often includes two-stage pressure regulating valves.

Regarding a fluid pressure regulating device provided by the related art, such as a valve assembly for a gas storage system provided by patent literature CN211423455U, the valve assembly for the gas storage system includes a valve body. The valve body is provided with a first-stage pressure regulating valve and a second-stage pressure regulating valve in turn. The valve body is provided with a valve seat, and the valve seat is provided with a valve core insertion hole, and a bottom of the valve core insertion hole is provided with a valve port. The first-stage pressure regulating valve includes a valve cavity housing for assembling a first-stage valve core and a first-stage pressure regulating spring. The valve cavity housing is provided with an external thread and is screwed onto the valve body. The first-stage valve core has an inserted segment, and the inserted segment is inserted in the valve core insertion hole. The first-stage valve core is provided with a flow channel configured to lead the hydrogen to the second-stage pressure regulating valve. An insertion sealing ring is provided between a hole wall of the valve core insertion hole and an outer peripheral surface of the valve core, and the pressure of a gas outlet connector is supported by the sealing ring.

However, the molecular weight of hydrogen is relatively small, and sealing is difficult, especially in the case of high pressure, so the fluid pressure regulating device may not be able to provide favorable sealing performance. In the abovementioned fluid pressure regulating device provided by the related art, when the first-stage pressure regulating valve is assembled to the valve body through the thread, the valve seat and the valve core need to rotate relatively to each other. The insertion sealing ring may thus be easily deformed and scratched, and the sealing reliability of the product may thereby be affected.

SUMMARY

The disclosure provides a gas pressure regulating device for vehicle capable of preventing an insertion sealing ring from being damaged as caused by relative rotation between a valve seat and a valve core during assembly.

The technical solutions adopted by the disclosure includes the following.

A gas pressure regulating device for vehicle includes a valve seat and a valve cavity housing.

The valve seat is provided with a valve core insertion hole, and a bottom of the valve core insertion hole is provided with a valve port.

The valve cavity housing is detachably assembled with the valve seat. A valve core is guided and assembled in the valve cavity housing, the valve core has an inserted segment, the inserted segment is inserted in the valve core insertion hole, and the valve core is provided with a flow channel.

An insertion sealing ring is provided between a hole wall of the valve core insertion hole and an outer peripheral surface of the inserted segment of the valve core.

The valve seat and the valve cavity housing are relatively translated in an axial direction of the valve core insertion hole and are assembled in place in a relatively translational manner.

A fixed structure is provided between the valve seat and the valve cavity housing, and the fixed structure is configured to relatively fix the valve seat and the valve cavity housing when the valve seat and the valve cavity housing are assembled in place.

Beneficial effects include the following: by adopting the abovementioned technical solution, the valve seat and the valve cavity housing are relatively translated in the axial direction of the valve core insertion hole and are assembled in place in a relatively translational manner. Further, the fixed structure may relatively fix the valve seat and the valve cavity housing when the valve seat and the valve cavity housing are assembled in place. In this way, relative rotation between the valve seat and the valve cavity housing is not generated during assembly, so relative rotation between the valve core insertion hole on the valve seat and the valve core disposed in the valve cavity housing is not generated. As such, the insertion sealing ring is prevented from being deformed and scratched as caused by rotation, and the product may thus be able to provide favorable sealing reliability.

In a preferred technical solution, the fixed structure includes a valve seat crimping piece, the valve seat crimping piece is fixedly connected to the valve cavity housing, and the valve seat is crimped and mounted on the valve cavity housing.

Beneficial effects include the following: by adopting the abovementioned technical solution, it is convenient to process the valve seat separately, so as to improve the machining accuracy and facilitate maintenance.

In a preferred technical solution, the valve seat crimping piece and/or the valve cavity housing is provided with a flange structure, and the valve seat crimping piece and the valve cavity housing are relatively fixed by the flange structure and a fixing screw passing through the flange structure.

Beneficial effects include the following: the flange structure and the fixing screw are simple in structure and may be easily disassembled and assembled.

In a preferred technical solution, the valve seat crimping piece is a gas inlet connector, the gas inlet connector is provided with a gas inlet passage, and the gas inlet passage butts on the valve port of the valve seat.

A sealing ring is provided between the gas inlet connector and the valve seat and/or between the gas inlet connector and the valve cavity housing to prevent gas leakage from a position of butting between the gas inlet passage and the valve port.

Beneficial effects include the following: by adopting the abovementioned technical solution, a separate valve seat crimping piece is not required to be additionally arranged, and the structure is compact.

In a preferred technical solution, a filter element is embedded in the gas inlet passage, the filter element is a hollow cylindrical structure with a U-shaped longitudinal section, an opening of the U shaped faces the valve seat, a radial outer side of the opening end of the filter element is provided with an annular flange, and the annular flange is supported on an end of the gas inlet connector facing the valve seat.

Beneficial effects include the following: in the abovementioned technical solution, due to the separate arrangement of the valve seat and the gas inlet connector, the assembly requirements of the hollow cylindrical filter element are satisfied, and the filter element may also be easily disassembled, assembled, and maintained.

In a preferred technical solution, the gas inlet connector is provided with a sensor interface, the sensor interface communicates with the gas inlet passage, and is connected to a pressure sensor.

Beneficial effects include the following: by adopting the abovementioned technical solution, the detection function of the intake gas pressure may be integrated, and the structure is compact.

In a preferred technical solution, the gas inlet passage penetrates through the gas inlet connector in the axial direction of the valve core insertion hole, and the valve port is located on an extending path of the gas inlet passage.

Beneficial effects include the following: by adopting the abovementioned technical solution, a complete straight flow channel may be formed, the complexity of the flow channel is reduced, and the flow resistance is reduced.

In a preferred technical solution, the valve cavity housing is provided with a mounting counterbore, and the valve seat is embedded in the mounting counterbore to achieve radial positioning.

An end of the valve seat facing away from the valve core is provided with a boss, an annular gap is formed between the boss and a hole wall of the mounting counterbore, a side of the valve seat crimping piece close to the valve seat is provided with an annular protrusion, and the annular protrusion is embedded in the annular gap.

Beneficial effects include the following: by adopting the above technical solution, the valve seat crimping piece may be positioned, and favorable structural stability is provided.

In a preferred technical solution, a gap is provided between an end surface of the annular protrusion and the valve seat.

Beneficial effects include the following: by adopting the above technical solution, over-positioning may be prevented from occurring, and the sealing ring between the valve seat and the valve seat crimping piece may be reliably pressed, and favorable airtightness is provided.

In a preferred technical solution, the valve seat and/or the valve cavity housing is provided with a flange structure, and the valve seat and the valve cavity housing are relatively fixed by the flange structure and a fixing screw passing through the flange structure.

Beneficial effects include the following: by adopting the above technical solution, a simple structure is provided, and the disassembly and assembly may be conveniently performed.

Figure 1:
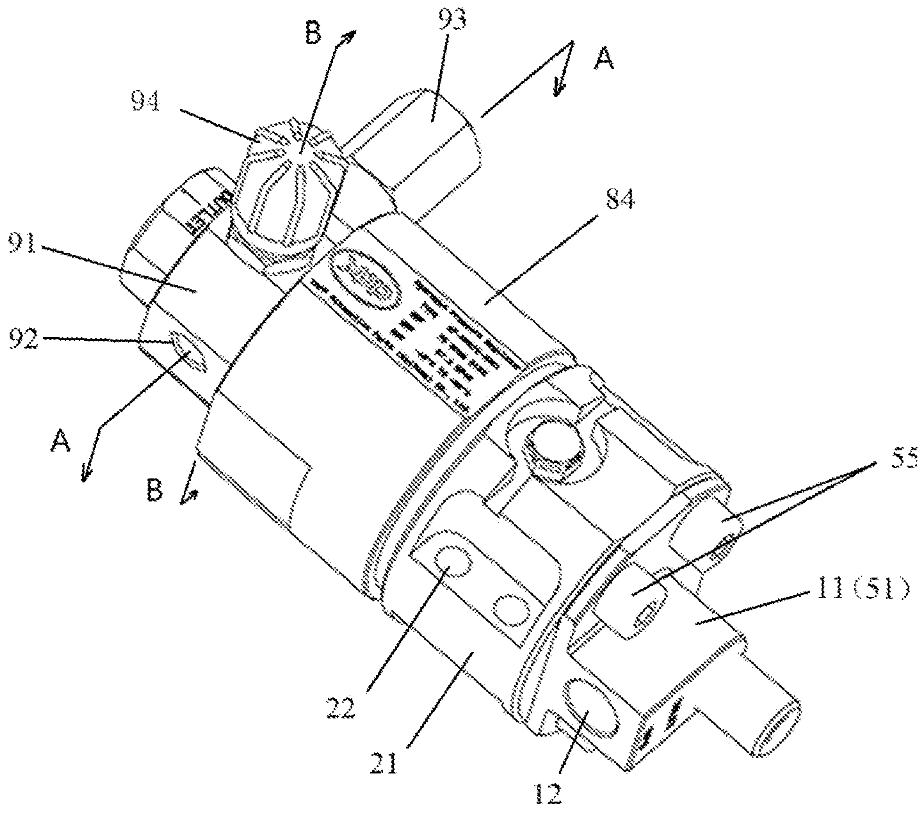
FIG. 1 is a three-dimensional view of a gas pressure regulating device for vehicle according to Embodiment 1 of the disclosure.

The names of the components corresponding to the corresponding reference numbers in the figures are: 11: gas inlet connector, 12: high-pressure sensor interface, 21: valve cavity housing, 22: fixing hole, 23: second-stage valve seat mounting cylinder, 24: mounting counterbore, 25: connecting cylinder, 26: breathing passage, 27: breathing valve, 28: connecting passage, 30: valve core insertion hole, 31: valve seat, 32: boss, 33: valve port, 34: hole wall, 41: first-stage valve core, 42: guide segment, 43: first-stage pressure regulating spring, 44: inserted segment, 45: insertion sealing ring, 46: first-stage sealing block, 47: flow channel, 48: relieving port, 51: valve seat crimping piece, 52: gas inlet passage, 53: annular protrusion, 54: flange structure, 55: fixing screw, 61: filter element, 62: annular flange, 71: second-stage valve seat, 72: second-stage valve core, 73: second-stage pressure regulating spring, 74: second-stage sealing block, 75: conical boss, 76: communication hole, 77: Y-shaped sealing ring, 78: axial through passage, 81: annular step, 82: valve seat pressing sleeve, 83: supporting gasket, 84: crimping sleeve, 91: gas outlet connector, 92: low-pressure sensor interface, 93: pressure relief valve, and 94: service port.

DESCRIPTION OF THE EMBODIMENTS

In order to make the objectives, technical solutions, and advantages of the disclosure clearer and more comprehensible, the disclosure is further described in detail in combination with the drawings and embodiments. It should be understood that the specific embodiments described herein serve to explain the disclosure merely and are not used to limit the disclosure. That is, the described embodiments are merely part of the embodiments, rather than all of the embodiments, of the disclosure. The components of the embodiments of the disclosure generally described and illustrated in the drawings herein may be arranged and designed in a variety of different configurations.

Therefore, the following detailed description of the embodiments of the disclosure provided in the accompanying drawings is not intended to limit the scope of the disclosure as claimed, but is merely representative of selected embodiments of the disclosure. Based on the embodiments of the disclosure, all other embodiments obtained by a person having ordinary skill in the art without making any inventive effort fall within the scope that the disclosure seeks to protect.

It should be noted that relational terms such as the terms "first" and "second" that may appear in the specific embodiments of the disclosure are only used to distinguish one entity or operation from another entity or operation, and do not necessarily require or imply any such actual relationship or order between these entities or operations. Moreover, the terms "including", "comprising", or any other variations thereof that may be provided, are intended to cover non-exclusive inclusion, so that a process, method, object, or device including a series of elements includes not only those elements, but also other elements that are not explicitly listed, or includes elements inherent to the process, method, object, or device. If there are no more restrictions, the element defined by the sentence "including a . . . " that may be provided does not exclude the existence of other identical elements in the process, method, object, or device that includes the element.

In the description of the disclosure, unless clearly specified and defined otherwise, the terms "mounted", "connected", and "connecting" that may appear should be understood in a broad sense, for instance, it can be a fixed connection, a detachable connection, or an integral connection, it can be a mechanical connection or an electrical connection, it can be a direct connection or indirect connection through an intermediate medium, or it can be the internal communication between two elements. For a person having ordinary skill in the art, the specific meaning of the above-mentioned terms in the disclosure can be understood through specific circumstances.

In the description of the disclosure, unless clearly specified and defined otherwise, the term "provided with" that may appear should be construed in a broad sense. For instance, the object that is "provided" may be a part of the body, or it may be arranged separately from the body and connected to the body, and the connection may be a detachable connection or a non-detachable connection. For a person having ordinary skill in the art, the specific meaning of the above-mentioned terms in the disclosure can be understood through specific circumstances.

The disclosure will be further described in detail below together with the embodiments.

Embodiment 1 of Gas Pressure Regulating Device for Vehicle in Disclosure

Figure 2:
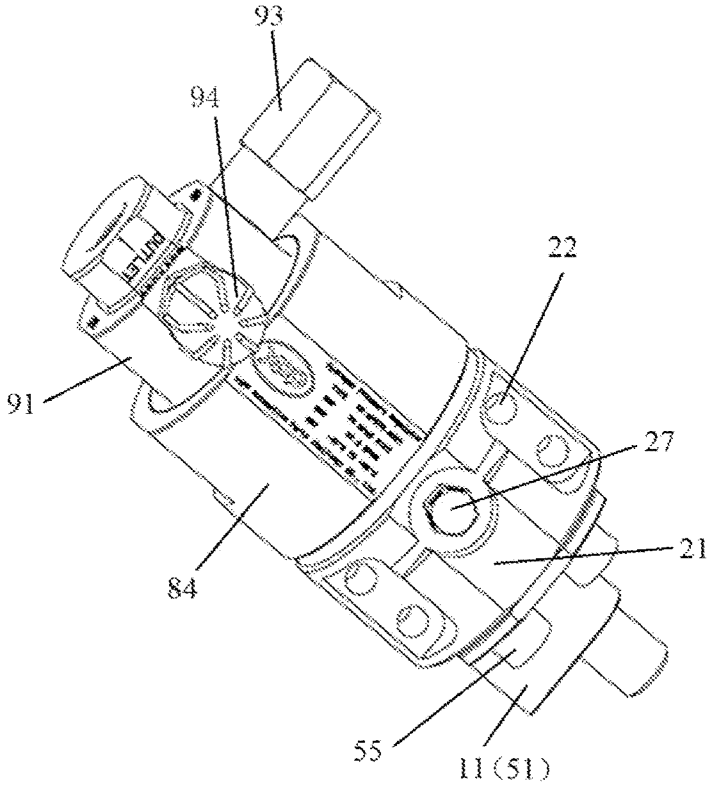
FIG. 2 is another three-dimensional view of the gas pressure regulating device for vehicle according to Embodiment 1 of the disclosure.
Figure 3:
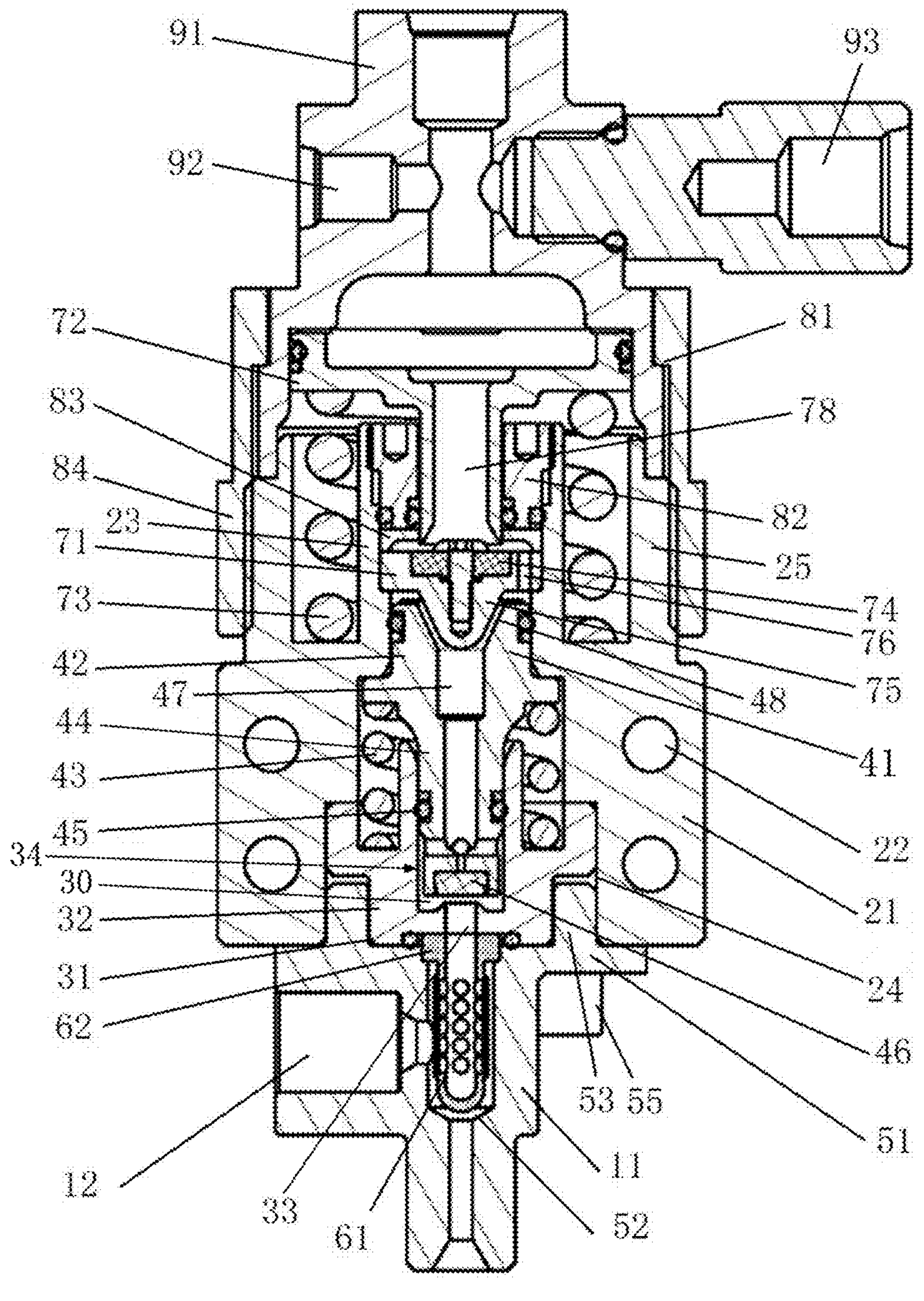
FIG. 3 is a cross-sectional view taken along A-A in FIG. 1.
Figure 4:
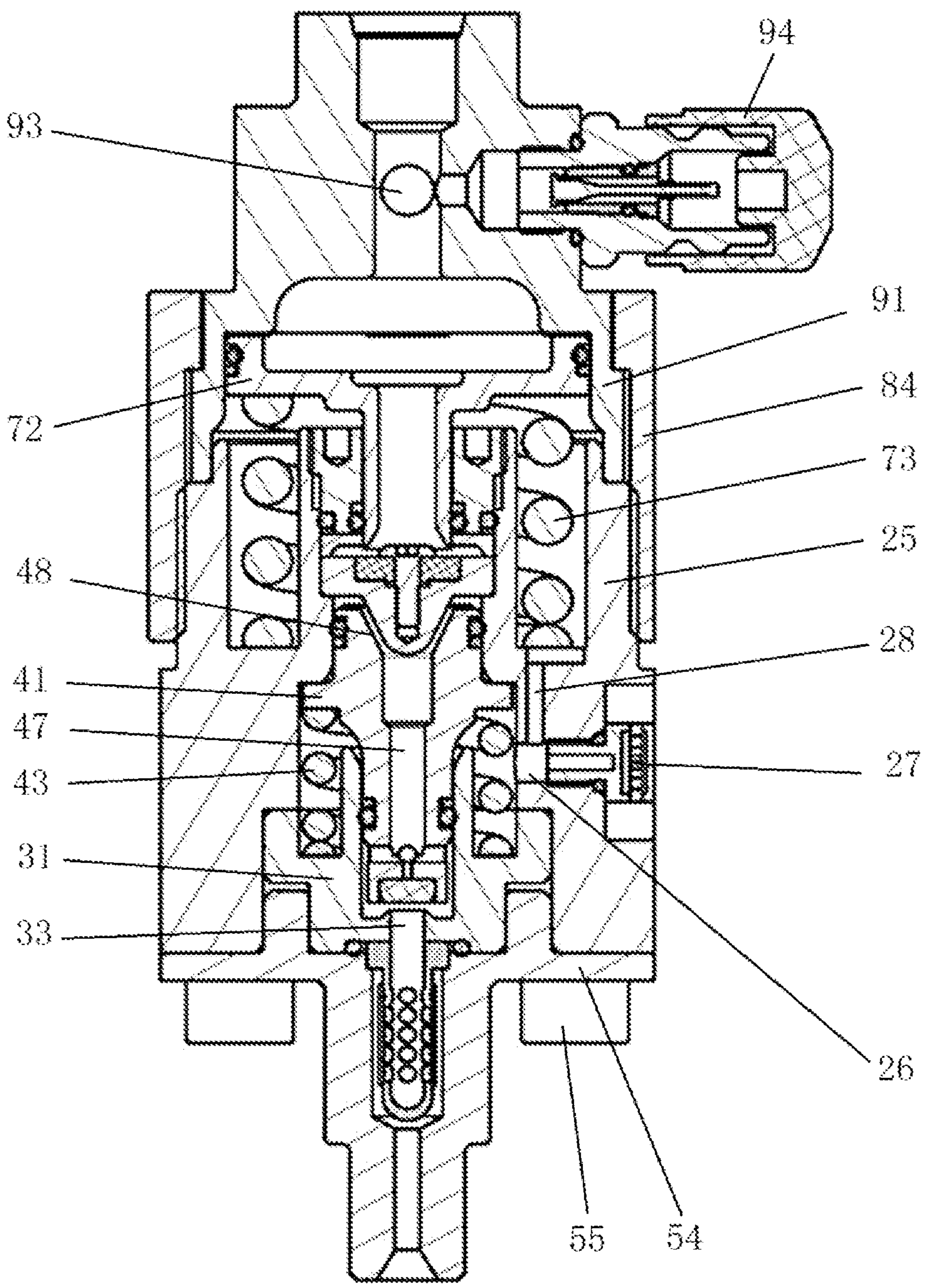
FIG. 4 is a cross-sectional view taken along B-B in FIG. 1.
Figure 5:
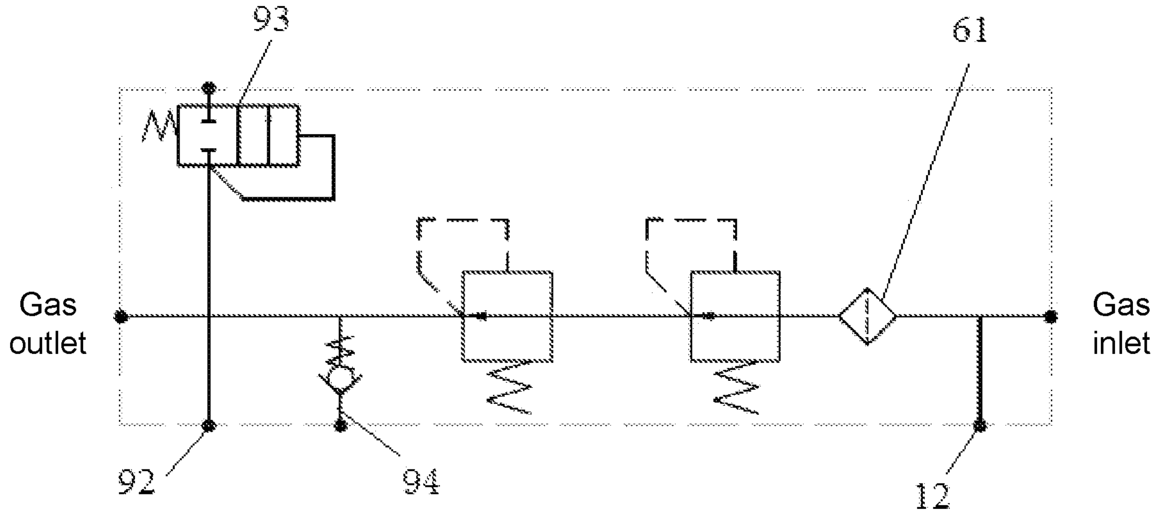
FIG. 5 is a functional schematic view of the gas pressure regulating device for vehicle according to Embodiment 1 of the disclosure.

The gas pressure regulating device for vehicle in this embodiment is a high-pressure hydrogen gas pressure regulating device for vehicle used in a hydrogen energy vehicle. As shown in FIG. 1 and FIG. 2, the gas pressure regulating device for vehicle includes a gas inlet connector 11, a main valve body (i.e., a valve cavity housing 21), a crimping sleeve 84, and a gas outlet connector 91. The main valve body is provided with a fixing hole 22 to achieve the fixation of the gas pressure regulating device for vehicle. The main valve body is provided with a first-stage pressure regulating valve and a second-stage pressure regulating valve configured for achieving two-stage pressure regulating. As shown in FIG. 3, FIG. 4, and FIG. 5, the gas inlet connector 11 is provided with a high-pressure sensor interface 12, and the gas outlet connector 91 is provided with a pressure relief valve 93, a low-pressure sensor interface 92, and a service port 94.

In order to describe the embodiments of the disclosure clearly, in the following, in the gas pressure regulating device for vehicle, the end provided with the gas inlet connector 11 is a lower end, and the end provided with the gas outlet connector 91 is an upper end, which is consistent with the orientation shown in FIG. 3. Certainly, the above "upper" and "lower" may not be used to limit the actual placement or use of the gas pressure regulating device for vehicle. The gas pressure regulating device for vehicle may be arranged horizontally, obliquely, or vertically, and when the gas pressure regulating device for vehicle is arranged vertically, one end of the gas inlet connector 11 may also be directed upwards.

To be specific, as shown in FIG. 3 and FIG. 4, the first-stage pressure regulating valve is disposed on the main valve body, and the main valve body forms the valve cavity housing 21 of the first-stage pressure regulating valve. A valve cavity of the first-stage pressure regulating valve is provided with a first-stage valve core 41 and a first-stage pressure regulating spring 43, and the first-stage valve core 41 is disposed up and down. The upper end is supported on an annular stop step disposed on the valve cavity housing 21. The first-stage pressure regulating spring 43 is configured to provide the first-stage valve core 41 with a force to move upwards and to move away from a valve port 33. In order to facilitate correction of a pressure-regulating pressure, the lower end of the first-stage pressure regulating spring 43 is provided and padded with a first-stage valve adjusting gasket. A thickness of the first-stage valve adjusting gasket is 0.1 mm or 0.2 mm, and the pressure-regulating pressure may be regulated by increasing or decreasing the number of the first-stage valve adjusting gaskets. A center position of a top portion of the valve cavity housing 21 is provided with a second-stage valve seat mounting cylinder 23 for a second-stage valve seat 71 to be assembled. A top portion of the first-stage valve core 41 is provided with a guide segment 42, and the guide segment 42 is provided with a sealing ring groove. The sealing ring groove is provided with a sealing ring, and the sealing ring enables the guide segment 42 to slidably seal an inner wall of the second-stage valve seat mounting cylinder 23.

The lower end of the valve cavity housing 21 is provided with a mounting counterbore 24, and a valve seat 31 of the first-stage pressure regulating valve is embedded in the mounting counterbore 24. The valve seat 31 of the first-stage pressure regulating valve is provided with a valve core insertion hole 30, and a bottom of the valve core insertion hole 30 is provided with the valve port 33. The lower end of the first-stage valve core 41 is provided with an inserted segment 44, and inserted segment 44 is inserted in the valve core insertion hole 30. An insertion sealing ring 45 is provided between a hole wall 34 of the valve core insertion hole 30 and an outer peripheral surface of the inserted segment 44 of the valve core. A first-stage sealing block 46 is embedded on a lower end surface of the first-stage valve core 41. The first-stage sealing block 46 is configured to be matched with the valve port 33 to form openness of a certain degree and to achieve pressure regulating. An internal portion of the first-stage valve core 41 is provided with a flow channel 47, which is configured to lead to the second-stage pressure regulating valve of the gas pressure regulating device for vehicle. The flow channel 47 includes an axial passage and a radial passage, and the radial passage is disposed on a small diameter segment below the insertion sealing ring 45. An outer end of the radial passage communicates with an annular gap between the first-stage valve core 41 and the hole wall 34 of the valve core insertion hole 30, and an inner end of the radial passage communicates with the axial passage.

An outer peripheral surface of the valve seat 31 is a smooth cylindrical surface. An outer diameter is matched with an inner diameter of the mounting counterbore 24 to achieve radial positioning, and the valve seat 31 and the valve cavity housing 21 may be relatively translated in an axial direction of the valve core insertion hole 30 and may be assembled in place in a relatively translational manner. A top end surface of the valve seat 31 is supported on a bottom wall of the mounting counterbore 24 to achieve axial positioning. The gas pressure regulating device for vehicle further includes a valve seat crimping piece 51. The valve seat crimping piece 51 is the gas inlet connector 11, the gas inlet connector 11 is provided with a gas inlet passage 52, and the gas inlet passage 52 penetrates through the gas inlet connector 11 in the axial direction of the valve core insertion hole 30. The valve port 33 is located on an extending path of the gas inlet passage 52, and the gas inlet passage 52 butts on the valve port 33 of the valve seat 31. An end of the valve seat 31 facing away from the valve core 41 is provided with a boss 32. An annular gap is formed between the boss 32 and a hole wall of the mounting counterbore 24. A side of the valve seat crimping piece 51 close to the valve seat 31 is provided with an annular protrusion 53, and the annular protrusion 53 is embedded in the annular gap to achieve radial positioning. An upper end surface of the gas inlet connector 11 is pressed against a lower end face of the boss 32 to fix the valve seat 31 onto the valve cavity housing 21. The valve seat crimping piece 51 is provided with a flange structure 54, and a screw penetrates through the flange structure 54. The valve seat crimping piece 51 may be fixed onto the valve cavity housing 21 through the screw to form a fixed structure, so as to relatively fix the valve seat 31 and the valve cavity housing 21 when the valve seat 31 and the valve cavity housing 21 are assembled in place. In order to prevent gas leakage from a position of butting between the gas inlet passage 52 and the valve port 33, a sealing ring is provided between the gas inlet connector 11 and the valve seat 31, and the sealing ring is disposed in an annular groove on a lower end face of the valve seat 31. A gap is provided between an end surface of the annular protrusion 53 and the valve seat 31, so that the sealing ring on the valve seat 31 is pressed, and the valve seat 31 and the gas inlet connector 11 are sealed.

A filter element 61 is embedded in the gas inlet passage 52 on the gas inlet connector 11. The filter element 61 is a hollow cylindrical structure with a U-shaped longitudinal section, and an opening of the U shape faces the valve port 33. A radial outer side of the opening end of the filter element 61 is provided with an annular flange 62, and the annular flange 62 is supported on an end of the gas inlet connector 11 facing the valve seat 31. The high-pressure sensor interface 12 on the gas inlet connector 11 is perpendicular to the gas inlet passage 52, and an inner end of the sensor interface corresponds to a lower end of the filter element 61. A lowermost end of the gas inlet connector 11 is provided with an external thread for corresponding pipeline connection.

The second-stage pressure regulating valve is disposed above the first-stage pressure regulating valve and includes the second-stage valve seat 71, a second-stage valve core 72, and a second-stage pressure regulating spring 73. The second-stage valve seat 71 is disposed in the second-stage valve seat mounting cylinder 23, a lower end is supported on a support ring platform on an inner wall of the second-stage valve seat mounting cylinder 23, and an upper end is provided with a valve seat pressing sleeve 82 and a supporting gasket 83. The valve seat pressing sleeve 82 is provided with an external thread threadedly connected onto the second-stage valve seat mounting cylinder 23, and the second-stage valve core 72 is fixed by the supporting gasket 83. A sealing ring is provided between the valve seat pressing sleeve 82 and the inner wall of the second-stage valve seat mounting cylinder 23, a middle portion of the second-stage valve seat 71 is fixed with a second-stage sealing block 74 by a screw, and a lower side of the second-stage valve core 72 is provided with a conical boss 75, so that a long threaded hole may be machined on the second-stage valve seat 71 for screw assembly. A radial edge position of the second-stage sealing block 74 is provided with a communication hole 76 penetrating up and down, for gas in the valve cavity of the first-stage pressure regulating valve to enter the second-stage pressure regulating valve. Through the sealing ring provided between the valve seat pressing sleeve 82 and the supporting gasket 83, a lower end of the second-stage valve core 72 is slidably and sealedly inserted into the second-stage valve seat mounting cylinder 23 and may be matched with the second-stage sealing block 74 on the second-stage valve seat 71 when moving up and down to form openness of a certain degree and to achieve pressure regulating. The second-stage valve core 72 is provided with an axial through passage 78 communicating with a gas outlet passage penetrating in the axial direction on the gas outlet connector 91. In order to reduce an axial dimension of the pressure regulating device and achieve light weight and miniaturization, a relieving port 48 is provided on the top portion of the first-stage valve core 41. The relieving port 48 is a bell port configured for allowing the conical boss 75 at the lower side of the second-stage valve core 72 to be embedded in, such that the axial dimension may be saved, airflow is drained, and the flow resistance is reduced. Certainly, in other embodiments, the relieving port 48 on the top portion of the first-stage valve core 41 may also be formed by a cylindrical hole, and the portion on the lower side of the second-stage valve core 72 for arranging the threaded hole may also be a cylindrical structure.

The low-pressure sensor interface 92 and the pressure relief valve 93 on the gas outlet connector 91 are perpendicular to the gas outlet passage, and the gas outlet connector 91 is further provided with the service port 94.

An upper portion of the valve cavity housing 21 is provided with a connecting cylinder 25, the connecting cylinder 25 and the second-stage valve seat mounting cylinder 23 are coaxially arranged, and the second-stage pressure regulating spring 73 is arranged in an annular space between the two. An lower end of the second-stage pressure regulating spring 73 is directly or indirectly supported on a bottom surface of the annular space, and an upper end is supported on the second-stage valve core 72 for providing the second-stage valve core 72 with a force to move upwards and to move away from the valve port 33. In order to facilitate the correction of the pressure-regulating pressure, the lower end of the second-stage pressure regulating spring 73 is provided and padded with a second-stage valve adjusting gasket. A thickness of the second-stage valve adjusting gasket is 0.1 mm or 0.2 mm, and the pressure-regulating pressure may be regulated by increasing or decreasing the number of the second-stage valve adjusting gaskets. The gas outlet connector 91 is fastened onto a top portion of the connecting cylinder 25, supported on an outer ring platform of the top portion of the connecting cylinder 25, and forms a valve cavity of the second-stage pressure regulating valve together with the connecting cylinder 25. The crimping sleeve 84 is configured to crimp the gas outlet connector 91 onto the valve cavity housing 21. To be specific, the connecting cylinder 25 of the valve cavity housing 21 is provided with an external thread, and an upper end of an inner wall of the crimping sleeve 84 is provided with an annular step 81. The annular step 81 is configured to press an outer annular platform provided on the outer peripheral surface of the gas outlet connector 91 when the crimping sleeve 84 is threadedly connected onto the connecting cylinder 25, such that the second-stage valve core 72 is pressed. Similarly, by pressing the second-stage valve core 72 with the crimping sleeve 84, the second-stage valve core 72 is prevented from rotating during assembly, and the sealing ring of an insertion segment between the second-stage valve core 72 and the inner wall of the valve core insertion hole 30 or the sealing ring between the second-stage valve core 72 and the gas outlet connector is prevented from being damaged.

As shown in FIG. 4, the outer peripheral surface of the valve cavity housing 21 is provided with a breathing passage 26 communicating with the valve cavity of the first-stage pressure regulating valve. An outer end of the breathing passage 26 is provided with a breathing valve 27 configured to prevent pressure in the valve cavity from changing when the valve core moves, which will affect the movement of the valve core. A bottom surface of the annular space is provided with a connecting passage 28 communicating with the breathing passage 26, so that the valve cavity of the second-stage pressure regulating valve and the valve cavity of the first-stage pressure regulating valve share one breathing valve 27, and a compact structure is thereby provided.

During assembly, the valve core of the first-stage pressure regulating valve is inserted into the mounting counterbore 24 at the lower end of the valve cavity housing 21 in a translational manner, so that the valve core is supported on the bottom of the mounting counterbore 24. The gas inlet connector 11 is then press-fitted on the valve core in a translational manner and fixed onto the valve cavity housing 21 by fixing screws 55, and the valve seat 31 and the valve cavity housing 21 are assembled and fixed in this way.

When in use, high-pressure hydrogen enters the valve port 33 of the first-stage pressure regulating valve through the gas inlet connector 11 and the filter element 61, passes the first-stage valve core 41 through the radial passage and the axial passage on the valve core, and then acts on the upper end surface of the first-stage valve core 41 to push the first-stage valve core 41 to move downwards. The first-stage valve core 41 is thus kept in balance under the combined action of the gas pressure at the upper and lower ends and the first-stage pressure regulating spring 43, and first-stage pressure regulating is thereby achieved. The hydrogen after being subjected to the first-stage pressure regulating then enters the second-stage valve core 72 from the communication hole 76 on the second-stage valve seat 71, is discharged to the gas outlet connector 91 through the axial through passage 78 on the second-stage valve core 72, and acts on the upper end surface of the second-stage valve core 72 to push the second-stage valve core 72 to move downwards. The second-stage valve core 72 is thus kept in balance under the combined action of the gas pressure at the upper and lower ends and the second-stage pressure regulating spring 73, second-stage pressure regulating is thereby achieved, and gas is finally discharged from the gas outlet passage on the gas outlet connector 91.

Embodiment 2 of Gas Pressure Regulating Device for Vehicle in Disclosure

The difference between this embodiment and Embodiment 1 lies in that: in Embodiment 1, the fixed structure between the valve seat 31 and the valve cavity housing 21 includes the gas inlet connector 11, and the gas inlet connector 11 forms the valve seat crimping piece 51. However, in this embodiment, the gas inlet connector is disposed on the valve seat, which is equivalent to integrating and directly fixing the valve seat 31 and the gas inlet connector 11 in Embodiment 1 onto the valve cavity housing through the flange structure on the gas inlet connector. When the valve seat is integrated with the gas inlet connector, the filter element may be disposed to be loaded from the lower end of the gas inlet connector.

Embodiment 3 of Gas Pressure Regulating Device for Vehicle in Disclosure

The difference between this embodiment and Embodiment 1 lies in that: in Embodiment 1, the gas inlet connector 11 acting as the valve seat crimping piece 51 is fixed onto the valve cavity housing 21 through the flange structure 54 and the screw. However, in this embodiment, the valve cavity housing is provided with a radial fixing hole, and the annular protrusion of the gas inlet connector is provided with a threaded hole for a screw to penetrate from the radial fixing hole and be fixed onto the annular protrusion to fix the annular protrusion.

Embodiment 4 of Gas Pressure Regulating Device for Vehicle in Disclosure

The difference between this embodiment and Embodiment 1 lies in that: in Embodiment 1, the gas inlet connector 11 acting as the valve seat crimping piece 51 is fixed onto the valve cavity housing 21 through the flange structure 54 and the fixing screws 55. However, in this embodiment, the valve seat crimping piece is a pressure ring. The gas inlet connector passes downwards from the pressure ring, and the pressure ring is fixed onto the bottom end surface of the valve cavity housing by screws to fix the gas inlet connector onto the valve seat.

Embodiment 5 of Gas Pressure Regulating Device for Vehicle in Disclosure

The difference between this embodiment and Embodiment 4 lies in that: in Embodiment 4, the valve seat crimping piece 51 is a pressure ring. However, in this embodiment, the valve seat crimping piece is a pressure cap, the pressure cap is provided with an inner thread, the valve cavity housing is provided with an outer thread, and the pressure cap is fixed onto the valve cavity housing through threaded connection and presses the valve seat. Certainly, when the valve seat and the gas inlet connector are integrally formed, the valve seat crimping piece may also be pressed by a pressure cap.

Embodiment 6 of Gas Pressure Regulating Device for Vehicle in Disclosure

The difference between this embodiment and Embodiment 1 lies in that: in Embodiment 1, the end of the valve seat 31 facing away from the valve core is provided with the boss 32, the annular gap is formed between the boss 32 and the hole wall of the mounting counterbore 24, the side of the valve seat crimping piece 51 close to the valve seat 31 is provided with the annular protrusion 53, and the annular protrusion 53 is embedded in the annular gap. However, in this embodiment, an outer contour of the valve seat is cylindrical, and the upper end surface of the gas inlet connector is flat and is directly crimped on the valve seat.

Figure 6:
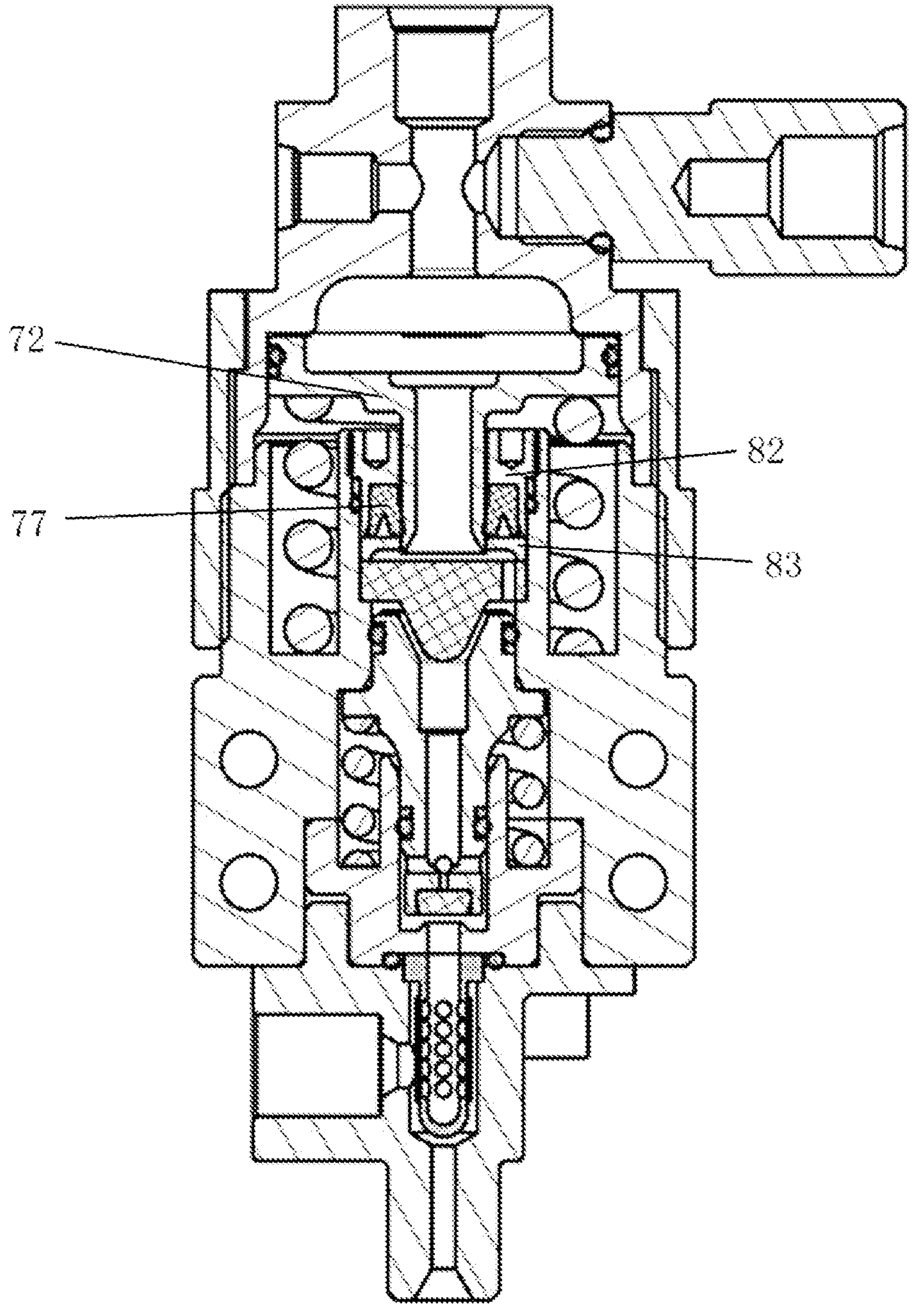
FIG. 6 is a schematic view of a structure of the gas pressure regulating device for vehicle according to another embodiment of the disclosure.
Figure 7:
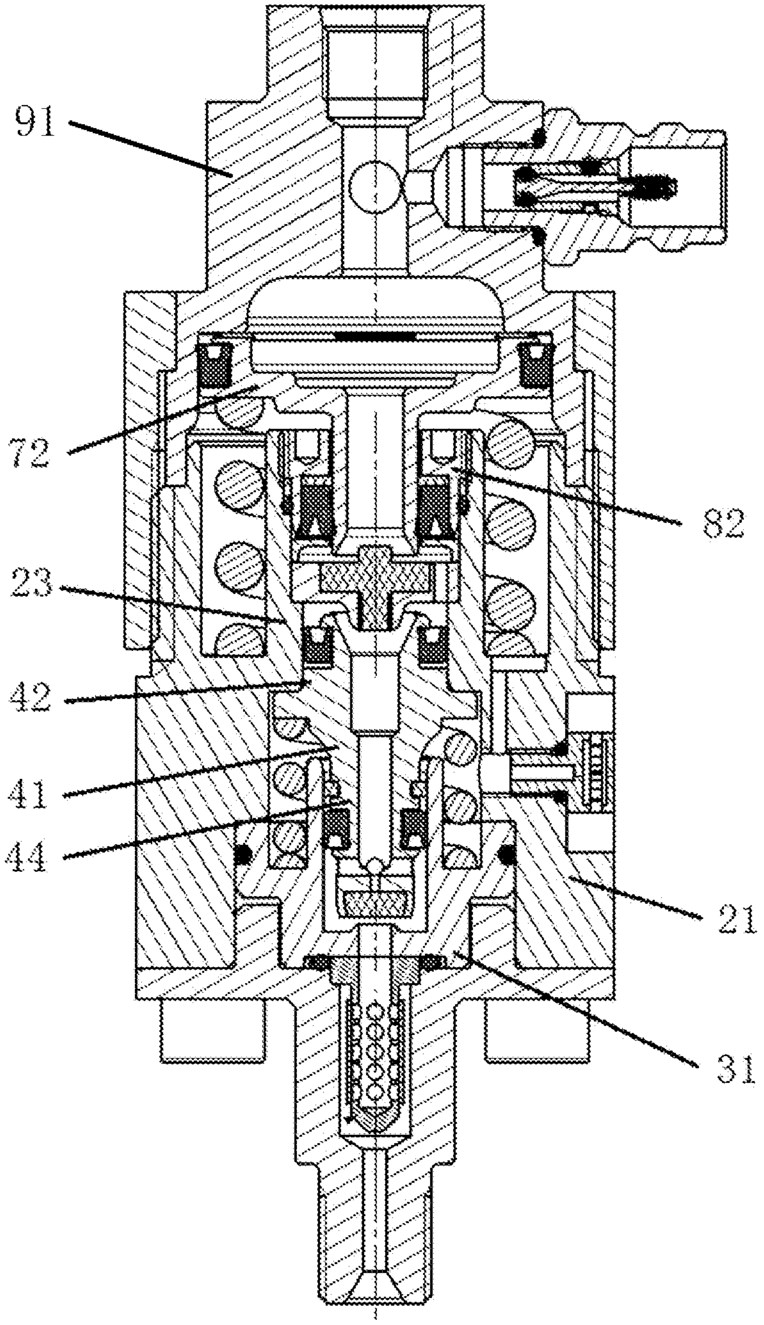
FIG. 7 is a schematic view of the structure of the gas pressure regulating device for vehicle according to still another embodiment of the disclosure.

The gas pressure regulating device for vehicle in the above embodiments includes two-stage pressure regulating valves, but in other embodiments, the gas pressure regulating device for vehicle may also be provided with only a one-stage pressure regulating structure. Besides, in the above embodiments, the second-stage valve core 72 and the valve seat pressing sleeve 82 are sealed by an O-ring, but in other embodiments, as shown in FIG. 6, a Y-shaped sealing ring 77 may also be used for sealing between the second-stage valve core 72 and the valve seat pressing sleeve 82. The cross section of the Y-shaped sealing ring 77 is Y-shaped, and the opening faces the second-stage valve seat 71. In this way, a linear self-sealing effect may be formed under the action of high-pressure hydrogen, friction may thus be reduced, and the pressure regulating performance of the second-stage pressure regulating valve may also be improved. Further, in other embodiments, as shown in FIG. 7, the Y-shaped sealing ring may also be used to seal between the second-stage valve core 72 and the gas outlet connector 91, between the guide segment 42 of the first-stage valve core 41 and the second-stage valve seat mounting cylinder 23 on the valve cavity housing 21, between the inserted segment 44 at the lower end of the first-stage valve core 41 and the valve core insertion hole 30 on the valve seat 31 in addition to being used to seal between the second-stage valve core 72 and the valve seat pressing sleeve 82.

The above description is only preferred embodiments of the disclosure and is not intended to limit the disclosure. The scope of the patent protection of the disclosure is subject to the claims, and any equivalent structural changes made by using the content of the description and drawings of the disclosure shall be included in the protection scope of the disclosure.

What is claimed is:

1. A gas pressure regulating device for vehicle, comprising:

a valve seat, wherein the valve seat is provided with a valve core insertion hole, and a bottom of the valve core insertion hole is provided with a valve port; and a valve cavity housing, detachably assembled with the valve seat, wherein a valve core is guided and assembled in the valve cavity housing, the valve core has an inserted segment, the inserted segment is inserted in the valve core insertion hole, and the valve core is provided with a flow channel, wherein an insertion sealing ring is provided between a hole wall of the valve core insertion hole and an outer peripheral surface of the inserted segment of the valve core, wherein the valve seat is adapted to be inserted into the valve cavity housing along an axial direction of the valve core insertion hole, a fixed structure is provided between the valve seat and the valve cavity housing, and the fixed structure is configured to fix the valve seat and the valve cavity housing.

2. The gas pressure regulating device for vehicle according to claim 1, wherein the fixed structure comprises a valve seat crimping piece, the valve seat crimping piece is fixedly connected to the valve cavity housing, and the valve seat is crimped and mounted on the valve cavity housing.

3. The gas pressure regulating device for vehicle according to claim 2, wherein the valve seat crimping piece and/or the valve cavity housing is provided with a flange structure, and the valve seat crimping piece and the valve cavity housing are fixed by the flange structure and a fixing screw passing through the flange structure.

4. The gas pressure regulating device for vehicle according to claim 3, wherein the valve seat crimping piece is a gas inlet connector, the gas inlet connector is provided with a gas inlet passage, and the gas inlet passage butts on the valve port of the valve seat, a sealing ring is provided between the gas inlet connector and the valve seat and/or between the gas inlet connector and the valve cavity housing to prevent gas leakage from a position of butting between the gas inlet passage and the valve port.

5. The gas pressure regulating device for vehicle according to claim 3, wherein the valve cavity housing is provided with a mounting counterbore, and the valve seat is embedded in the mounting counterbore to achieve radial positioning, an end of the valve seat facing away from the valve core is provided with a boss, an annular gap is formed between the boss and a hole wall of the mounting counterbore, a side of the valve seat crimping piece close to the valve seat is provided with an annular protrusion, and the annular protrusion is embedded in the annular gap.

6. The gas pressure regulating device for vehicle according to claim 2, wherein the valve cavity housing is provided with a mounting counterbore, and the valve seat is embedded in the mounting counterbore to achieve radial positioning, an end of the valve seat facing away from the valve core is provided with a boss, an annular gap is formed between the boss and a hole wall of the mounting counterbore, a side of the valve seat crimping piece close to the valve seat is provided with an annular protrusion, and the annular protrusion is embedded in the annular gap.

7. The gas pressure regulating device for vehicle according to claim 6, wherein a gap is provided between an end surface of the annular protrusion and the valve seat.

8. The gas pressure regulating device for vehicle according to claim 2, wherein the valve seat crimping piece is a gas inlet connector, the gas inlet connector is provided with a gas inlet passage, and the gas inlet passage butts on the valve port of the valve seat, a sealing ring is provided between the gas inlet connector and the valve seat and/or between the gas inlet connector and the valve cavity housing to prevent gas leakage from a position of butting between the gas inlet passage and the valve port.

9. The gas pressure regulating device for vehicle according to claim 8, wherein a filter element is embedded in the gas inlet passage, the filter element is a hollow cylindrical structure with a U-shaped longitudinal section, an opening of the U shaped faces the valve seat, a radial outer side of the opening end of the filter element is provided with an annular flange, and the annular flange is supported on an end of the gas inlet connector facing the valve seat.

10. The gas pressure regulating device for vehicle according to claim 8, wherein the gas inlet connector is provided with a sensor interface, and the sensor interface communicates with the gas inlet passage to be connected to a pressure sensor.

11. The gas pressure regulating device for vehicle according to claim 8, wherein the gas inlet passage penetrates through the gas inlet connector in the axial direction of the valve core insertion hole, and the valve port is located on an extending path of the gas inlet passage.

12. The gas pressure regulating device for vehicle according to claim 1, wherein the valve seat and/or the valve cavity housing is provided with a flange structure, and the valve seat and the valve cavity housing are relatively-fixed by the flange structure and a fixing screw passing through the flange structure.

* * * * *